United States Patent

[11] 3,586,762

[72] Inventors Frederick J. Hodge;
Ralph R. Barclay, both of Camarillo, Calif.
[21] Appl. No 796,082
[22] Filed Feb. 3, 1969
[45] Patented June 22, 1971
[73] Assignee Minnesota Mining and Manufacturing Company
St. Paul, Minn.

[54] DROPOUT COMPENSATOR FOR PAL COLOR TELEVISION
20 Claims, 8 Drawing Figs.

[52] U.S. Cl. .......... 178/5.4, 178/6.6
[51] Int. Cl. .......... H04n 5/42
[50] Field of Search .......... 178/6.6 A, 6.6 DO, 5.4 CD, 5.4 P

[56] References Cited
FOREIGN PATENTS
1,185,648 1/1965 Germany ..........

*Primary Examiner*—Robert L. Griffin
*Assistant Examiner*—Donald E. Stout
*Attorney*—Smyth, Roston and Pavitt

ABSTRACT: The present invention is directed to a dropout compensator for use in compensating for dropouts in the PAL color television system. The present invention separates the luminance information and the color information and feeds the separate information into two channels and operates on these channels independently. Specifically, the luminance information is delayed to provide for a luminance dropout compensating signal. The color information is also delayed but, in addition, the color information undergoes one of several types of functional operations so that the color information may be added to the luminance information to provide for the proper dropout compensating signal which may be substituted for the regular video signal when the dropout occurs. In one example of the invention, the color information is delayed for approximately a two-line period and then phase shifted in order to provide for the proper color dropout signal. In a second embodiment of the invention, the color signal is delayed and passed through a conjugate function generator to average out the errors over two lines and the color signal is then passed through a final one-line delay. In a final embodiment of the invention, the color signal is delayed a single line and is then modulated to produce the proper color dropout signal.

INVENTORS:
Frederick J. Hodge
Ralph R. Barclay

By Smyth, Roston & Pavitt
ATTORNEYS

INVENTORS:
Frederick J. Hodge
Ralph R. Barclay
By Smyth, Roston & Pavitt
ATTORNEYS INVENTORS:
Frederick J. Hodge
Ralph R. Barclay

ATTORNEYS

DROPOUT COMPENSATOR FOR PAL COLOR TELEVISION

The present invention is directed to a dropout compensator for a PAL color television system. The term "PAL" stands for "phase alternation line" and the PAL color television system was specifically designed as an improvement on the NTSC color television system that has been used for the transmission of color in The United States of America. The PAL color television system has been chosen as the standard by most countries in Western Europe for the transmission of color video signals. A clearer understanding of the PAL color television system may be had with reference to the following publications: "World Wide Color Television Standards" by Francis C. McLean, *IEEE Spectrum*, June 1966, pp 59—68; "The PAL Color Television System" by B. J. Rogers, *The Radio and Electronic Engineer*, Mar. 1967, pp 147—159.

The main difference between the PAL color television system and the NTSC color television system is that for the color portion of the signal a conjugate signal is transmitted on alternate lines. For example, using the standard notation in color television wherein the two color difference signals and their weighting factors are referred to as U and V, and for a first given line the signal in the PAL system is $U+jV$ and the adjacent lines are $U+jV$. In addition to the above, the PAL system has an offset for the subcarrier frequency which is referred to as a one-quarter line offset, which means for succeeding lines the phase is changed. In actuality, the phase change is not 90° but is closer to 76°.

These changes in the PAL color television signal provide for a system which is affected less by transmission errors than the NTSC color television signals. These changes do add a degree of complexity in the transmitter and receiver and in situations where the transmission is stable these changes are not necessary. However, the PAL color television system has been approved and chosen by most countries in Western Europe and it is therefore desirable to provide for a dropout compensating system for use with the PAL color television system.

The present invention provides for a dropout compensator which may be used with various types of dropout compensating systems which are already known. Specifically, a general type of dropout compensator includes a dropout detector which detects for dropouts in a video signal, usually in the modulated form of the video signal. The video signal may also be fed to a switch and with a second delayed compensating signal also fed to the switch. The compensating signal is of a type to replace the ordinary video signal during those periods when a dropout in the video signal occurs.

Specifically, the dropout signal is usually a delayed version of the ordinary video signal and with a standard black and white system the delay may be approximately one scanning line. When the detector detects that a dropout has occurred the switch is controlled to pass the delayed signal in place of the regular signal so that the dropout does not appear on the television screen. Since adjacent lines of a television signal are usually quite redundant in content, the replacement of the information is not visible to the viewer. Various forms of this type of dropout system have been used wherein the compensating signal is either recirculated or not recirculated and wherein the signal applied to the switch is either demodulated or not demodulated.

The providing of a dropout compensating signal for color television is significantly more complicated than ordinary dropout compensation in black and white signals it is only necessary to delay the video signal the equivalent of one line and this delayed signal may then be used as a dropout compensating signal. Some prior art color dropout compensators merely substituted the proper luminance signal when a dropout occurred and ignored the color portion of the signal. However, if it is desirable to provide for a complete color dropout compensation it is necessary to operate on the complete video signal including the color portion. Therefore, it is much more difficult to provide for a complete color dropout compensation. One method that this may be accomplished by is separating the luminance information from the color information and with separate operations on these two portions of the complete video signal. For example, the luminance information may be delayed a single line and the color information may be also delayed for an appropriate period of time.

It is, however, not possible to merely split the video signal into luminance and color information with a subsequent delay of both portions of the information in order to provide for a complete compensation in the PAL color television signal. This is because, as indicated above, the PAL color television system includes the use of conjugate signals for alternate lines of color information and with an additional quarter-line offset between alternate lines.

The present invention, therefore, is specifically designated to provide for a complete color dropout compensation for use with the PAL color television system. Specifically, the present invention does provide for a splitting of the complete video signal into separate channels, one channel representing the luminance information with the second channel representing the color information. The color information is delayed not for a single line period as with prior art dropout compensators but undergoes both delay and functional operations so that the appropriate signal is present for the color compensating signal. For example, in one embodiment of the invention the color portion of the video signal is delayed for a period of time approximately equal to two lines, but since the color information also undergoes the quarter-line offset, the delay is chosen specifically so that the combined effect of the two-line delay plus the quarter-line offset gives a phase reversed signal at the output of the delay line. This phase reversed signal then passes through a phase shifter so that the proper color dropout compensating signal is present. A second embodiment of the invention is substantially an improvement over the first embodiment in that it does provide for this approximate two-line delay but uses a summing conjugate function generator so that there is a constant error averaging. A third embodiment of the system actually provides for only a single-line delay, but this delayed signal is then modulated to produce the proper color output dropout compensating signal.

The present invention, therefore, does not merely provide for a delay of the color portion of the video signal but always includes some functional operation on this delayed signal so that the input which serves as the dropout compensating signal always contains a proper color dropout compensating signal.

A clearer understanding of the invention will be had with reference to the following description and drawings wherein.

Figures 1, 2, 3, 4:
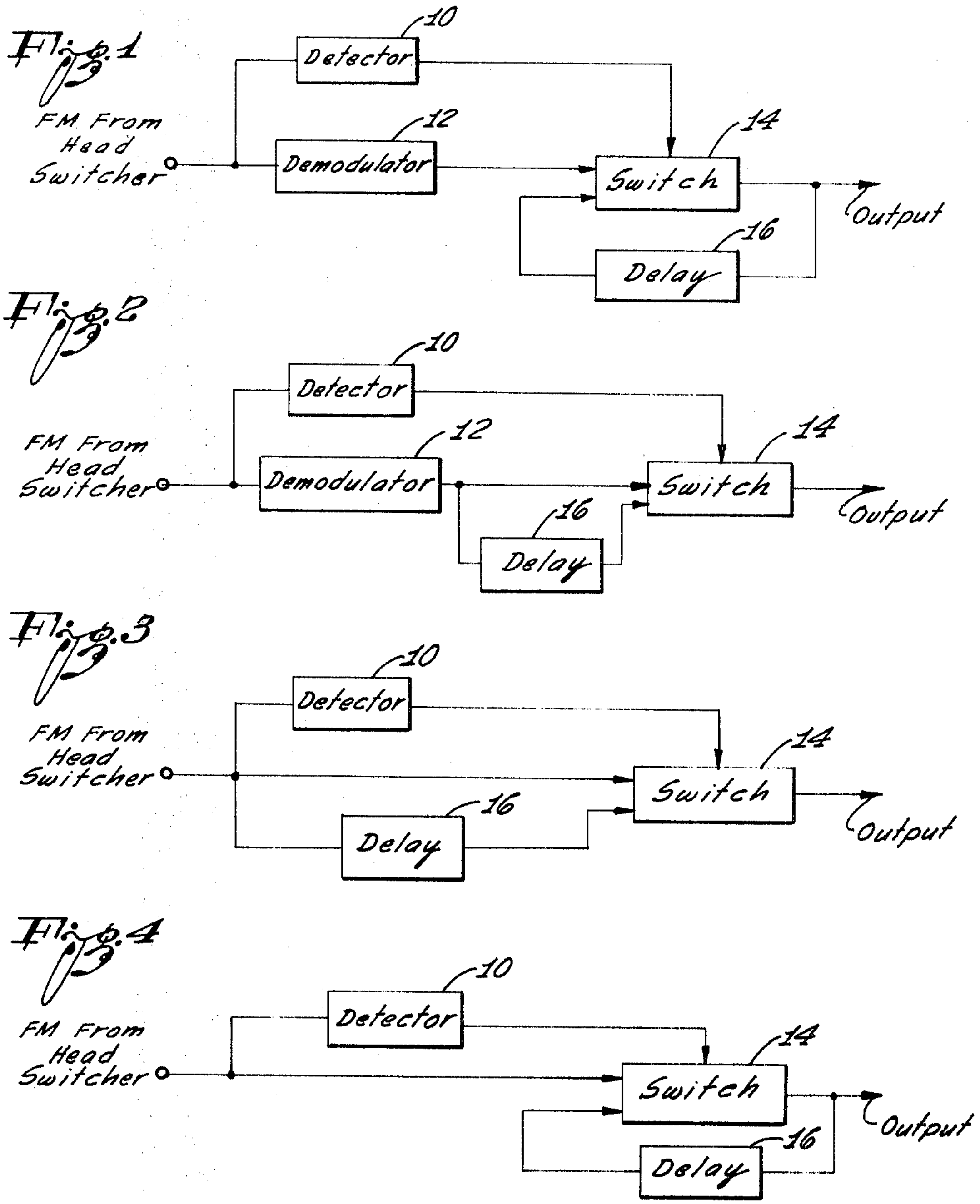
FIG. 1 illustrates a first general form of a dropout compensator.
FIG. 2 illustrates a second general form of a dropout compensator.
FIG. 3 illustrates a third general form of a dropout compensator.
FIG. 4 illustrates a fourth general form of a dropout compensator.

In FIG. 1, a first form of dropout compensating system which may incorporate the provisions of the present invention is shown. In FIG. 1, the signals from the magnetic tape, and specifically the output from the head switcher, is applied to a dropout detector 10. The dropout detector is of a known form and specifically detects dropouts as represented by changes in the amplitude of the envelope of the FM video signal from the head switcher. The output from the head switcher is also applied to a demodulator 12 which demodulates the FM video signal.

The demodulated signal is applied to a switch 14 as a first input to the switch. The output from the switch 14 is also recirculated through a delay system 16 and applied as a second input to the switch 14. Specifically, the detector 10 controls the switch 14 so that when no dropout is present in the output signal from the head switcher, the first input to the switch 14 from the demodulator 12 is passed through the switch 14. When a dropout is detected by the detector 10, the switch 14 is controlled by the detector 10 so that the second input from the delay system 16 is passed through the switch 14.

In a second form of a dropout compensator as shown in FIG. 2, the dropout from the head switcher is detected by the detector 10 to control the switch 14. In addition, the output from the head switcher is demodulated by the demodulator 12 and is applied directly from the demodulator 12 to the switch 14 as a first input to the switch. In addition, the output from the demodulator 12 may be coupled through the delay system 16 and the output from the delay system 16 is applied as the second input to the switch 14. As can be seen by an examination of FIGS. 1 and 2, these forms of dropout compensators differ in that FIG. 1 includes a recirculating path around the switch 14 so that if the dropout occurs for more than one line, the same information is repeated over and over again. The form of dropout compensation shown in FIG. 2 does not include this recirculating feature but the recirculation may not be necessary if the dropouts are not extensive.

FIG. 3 illustrates a third form of a dropout compensator wherein the output from the head switcher is monitored by the detector 10, which detector 10 provides a signal to control the operation of the switch 14. The output from the head switcher is directly applied to the switch 14 as a first input and the output from the head switcher is also applied through the delay system 16 to the switch 14. As can be seen, FIG. 3 does not include a demodulation as is present with the forms of dropout compensators shown in FIGS. 1 and 2.

In the fourth form of a dropout compensator shown in FIG. 4, the output from the head switcher is monitored by the detector 10 and the output from the detector 10 controls the switch 14. The output from the head switcher is also applied as a direct input to the switch 14 in the same manner as shown in FIG. 3 and the output off the switch 14 is used in combination with the delay system 16 to provide for a second input to the switch 14. The form of dropout compensator shown in FIG. 4 includes the recirculating feature shown in the form of dropout compensator shown in FIG. 1.

Figure 6:
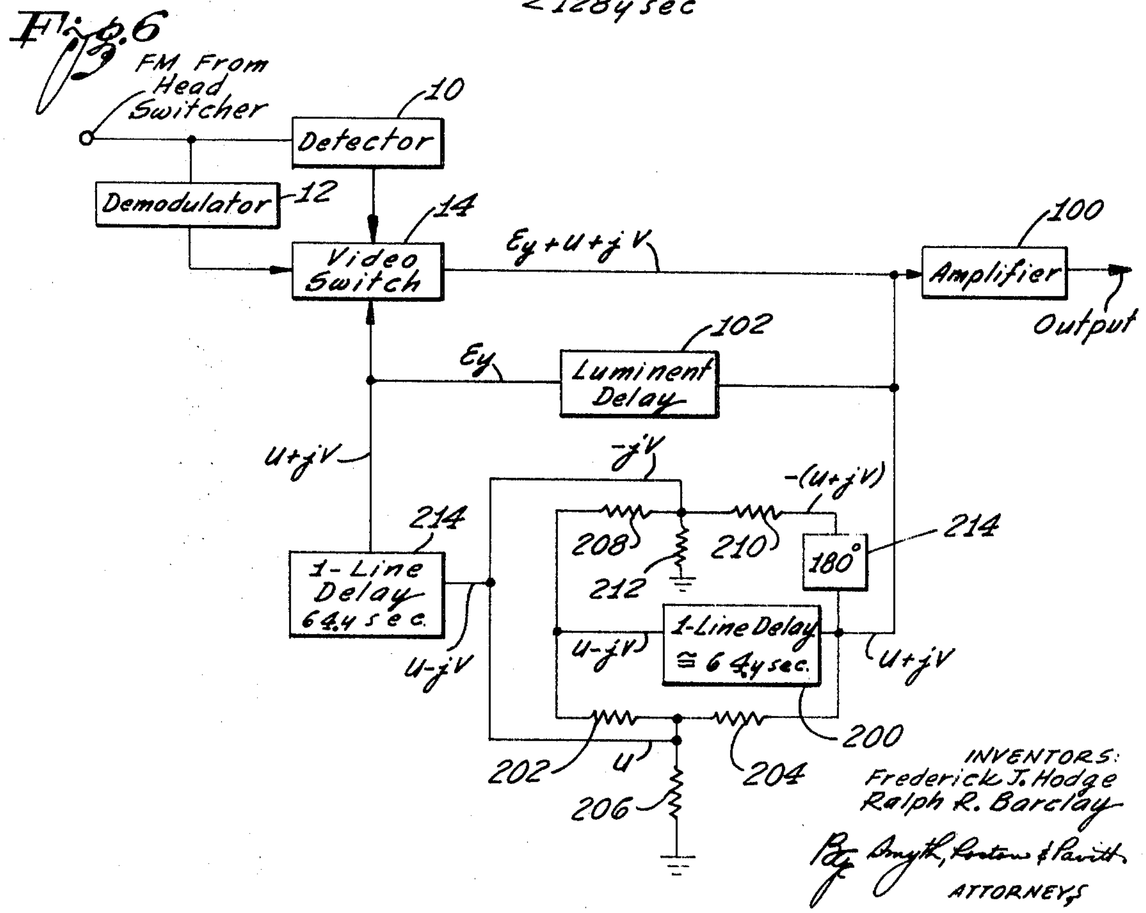
FIG. 6 illustrates a second embodiment of the invention again shown with reference to the form of dropout compensator shown in FIG. 1.
Figure 7:
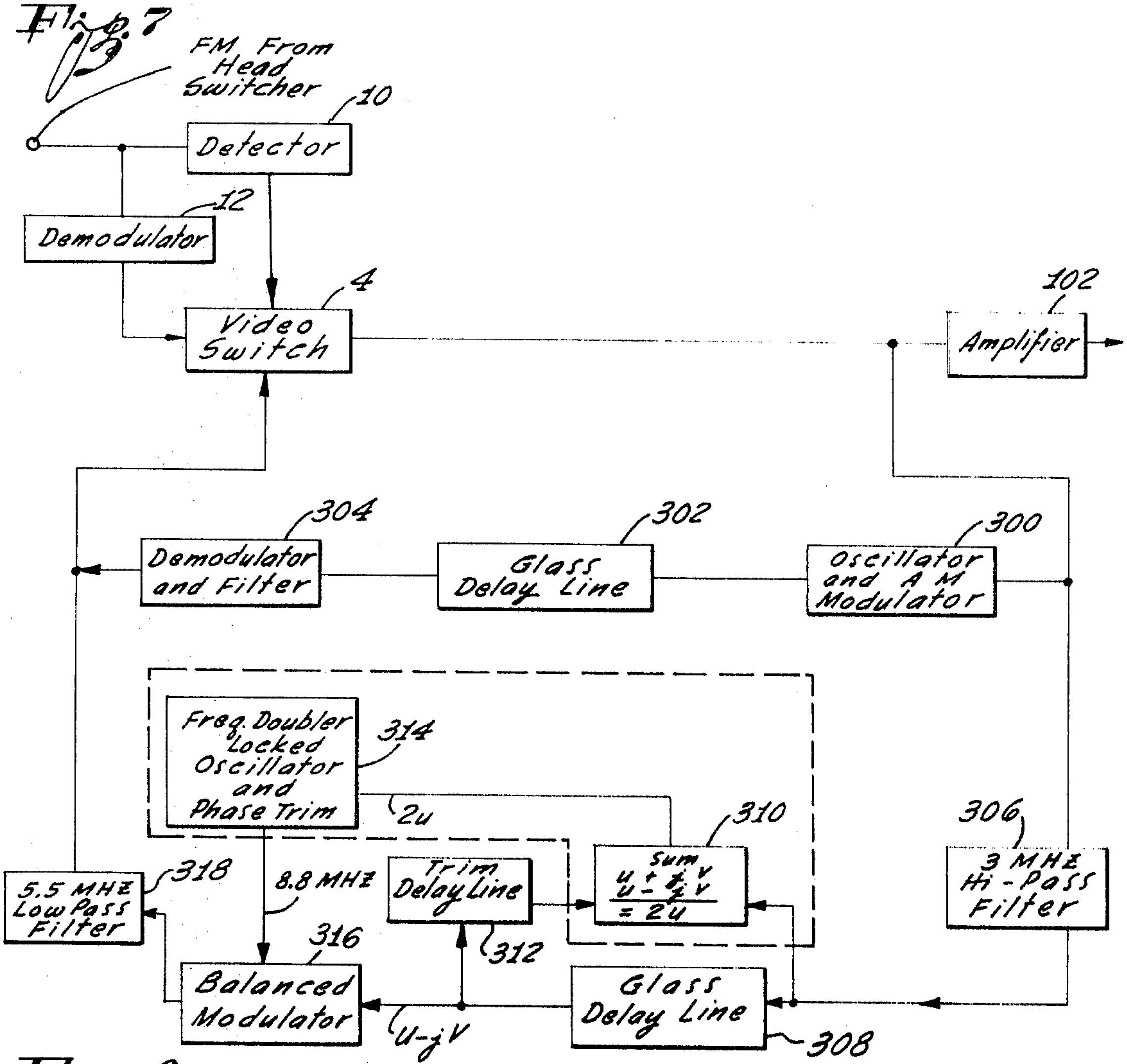
FIG. 7 illustrates a third embodiment of the invention again shown with reference to the form of dropout compensator shown in FIG. 1.

The present invention is directed to improvements in the delay system 16 shown in FIGS. 1 through 4 and specifically is directed to a delay system which is specifically constructed to provide for full dropout compensation for the PAL color television system. The invention as shown in the embodiments of FIGS. 5, 6 and 7 is illustrated with reference to FIG. 1, but it is to be appreciated that with appropriate modifications the invention may also be included in the dropout compensation systems as shown in FIGS. 2, 3 and 4 and in other dropout compensation systems which use the basic concept of providing for a delayed signal which is constructed from the original signal, which delay signal is used in place of the original signal when a dropout occurs.

Figure 5:
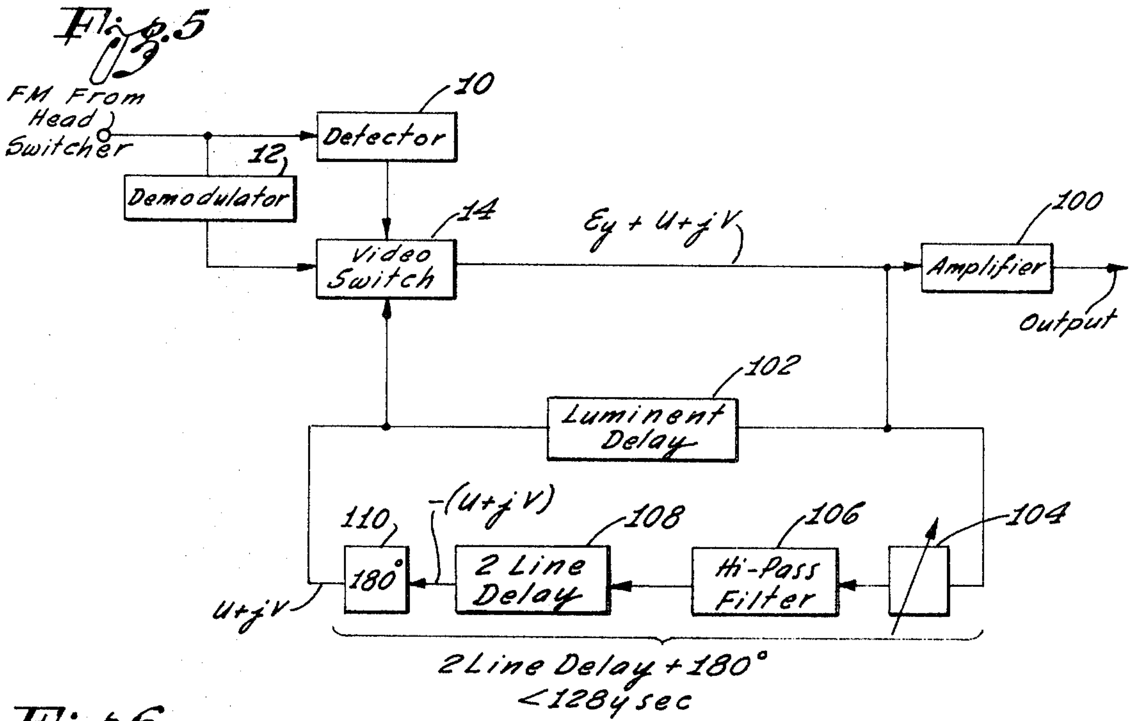
FIG. 5 illustrates a first embodiment of the invention shown specifically with reference to a form of dropout compensator shown in FIG. 1 but wherein the invention may be used in the other forms of dropout compensators shown in FIGS. 2, 3 and 4.

FIG. 5 illustrates a first embodiment of the dropout compensator of the present invention. The FM signal from the head switcher is applied as an output to the detector 10 and the demodulator 12. The output from the demodulator is applied as a first signal input to the video switch 14 and the detector 10 controls the video switch in the appropriate fashion, as explained above. The output from the video switch 14 is coupled to an amplifier 100 and the output signal from the amplifier 100 is the appropriate video output signal. Immediately prior to the amplifier 100 a feedback path is developed from the output of the video switch to form a second input to the video switch 14. As indicated above, the detector 10 controls which of the inputs to the video switch 14 is passed to the amplifier 100. The feedback path includes the appropriate delay and compensation and provides for particular functional operations on the color portion of the video signal so that the second input to the video switch 14 functions as a complete color dropout compensating signal.

As can be seen in FIG. 5, the video signal from the video switch 14 is subdivided into two channels. The first channel is referred to as the luminance channel and included in the luminance channel is the luminance delay system 102. This delay system 102 may be composed of nothing more than a delay line or the delay system may include other structures, but essentially the output from the luminance delay 102 is a delayed version of the luminance portion of the video signal. This luminance portion is delayed a particular period of time, which period of time may be equal to one line or two lines in a manner to be described later.

In addition to the luminance channel, a second channel, which is referred to as the chrominance channel and which passes the color portion of the video signal, is also used as part of the feedback path. As shown in FIG. 5, the input to the chrominance channel is designated by the vector summation of the color difference signals and is indicated to be $U+jV$. For convenience, only the color signals are considered since a high-pass filter is included to eliminate other information. It is to be appreciated that in the PAL color television signal if a particular line is $U+jV$, the preceding and following lines are the conjugate of $U+jV$ and are the summation signal $U-jV$. It can therefore be seen that it is not possible to merely delay the signal by one line as with prior art dropout compensators since this would present an improper signal to the video switch 14. It is therefore desirable to choose another delay time. Specifically, it can be seen that if a two-line delay is chosen, this could present the proper signal to the video switch 14. However, other complicating factors are included in the PAL color system. Specifically, the PAL color system includes what is referred to as a one-quarter line offset which is the 90° or one-quarter cycle phase shift in the reference subcarrier frequency that occurs from any given scan line to the next successive line, which offset further complicates the phase relationship of alternate lines of the color information. Therefore, it is not proper to merely include a simple two-line delay and the present invention is directed to systems which provide for the proper signal applied to the video switch 14 and which overcome these various difficulties caused by the PAL color television system.

The chrominance channel includes a trimmer delay 104 which is shown to be variable. The output from the trimmer delay is coupled to a 3 mHz. high-pass filter 106, which filter passes only the color information. The output from the high-pass filter 106 is connected to a delay line 108 which nominally provides for a two-line delay. The output from the delay line 108 is applied to a 180° phase shifter 110 which inverts the phase of the signal applied to the phase shifter 110. The various elements in the chrominance channel, which are the two delay lines 104 and 108, high-pass filter 106 and the phase inverter 110, all contribute some delay to the system. The total system is designed so that the output from the phase inverter 110 is again the signal $U+jV$, but is that signal of two lines back.

As indicated above, it is not proper to merely provide for a two-line delay. This is because, in addition to each alternate line being the conjugate of the other, the one-quarter line offset also provides for a change in the phase relationship between alternate lines. This one-quarter line offset occurs in each line and the system requires a functional operation to counterbalance the quarter-line offset. Therefore, the trimmer delay 104 is adjusted so that the combined effect of the two-line delay plus the one-quarter line offset in each line plus the trim delay gives an output of $-(U+jV)$ at the output of the delay line 108. This phase reversal at the output of the delay line 108 occurs because the one-quarter line offset is in each line. Since the one-quarter line offset in each line is not exactly equal to 90°, the trim delay 104 is adjusted to complete the phase reversal. The phase inverter 110 provides for a function operation to produce the proper phase relationship of the color dropout compensating signal.

The embodiment of FIG. 5 essentially provides for the use of the delayed signal in place of the original signal when the original signal includes a dropout. The delayed signal represents the signal of two lines before and because of the standard system of interlacing, the compensating signal as visually displayed on the television is actually four lines back. Since there can be considerable differences between signals representing information separated by two (or four) lines, it is desirable to use a compensating signal which is a closer approximation of the original signal which is to be replaced. The remaining embodiments of the invention show methods of providing for a closer approximation of the original signal.

For example, in FIG. 6 the output from the head switcher is again applied to the detector 10 and the demodulator 12. The output from the demodulator 12 is the original input to the video switch 14 and the output from the detector 10 controls the video switch 14. The output from the video switch 14 is passed through the amplifier 100 to form the compensated video output signal. The feedback path around the video switch 14 includes the luminance delay system 102 as described above with reference to FIG. 5. The second channel is essentially an improved version of the basic two-line delay system of FIG. 5 and includes structure for providing a constant error averaging of the dropout compensating signal.

As shown in FIG. 6, the chrominance channel includes a first delay line 200 for providing a delay of approximately one line. Assuming that the input to the line is $U+jV$, the output from the delay line which is the preceding line is $U-jV$. It is to be appreciated that the delay line 200 has the appropriate value to provide for the one-line delay and to compensate for the quarter-line offset. The chrominance channel also includes a pair of summing circuits, each of which is composed of a plurality of resistors. For example, the first summing circuit includes resistors 202, 204 and 206. The second summing circuit includes resistors 208, 210 and 212. A phase inverter 214 is used before the summing circuit including resistors 208, 210 and 212.

The summing circuits are used to provide for an averaging of the error in the dropout compensating signal and operate in the following fashion. The input $U+jV$ plus the output from the delay line 200, which is $U-jV$, is summed in the first summing circuit including the resistors 202, 204 and 206. The output from the first summing circuit forms a first component U. The input $U+jV$ with a phase inversion so as to equal $-(U+jV)$ is summed with the output from the delay line 200, which is $U-jV$, to form the component $-jV$. The component U and the component $-jV$ are summed to form a new summation signal $U-jV$ which signal is used as the input to a second delay line 214.

Because of the continuous summing by the two summing circuits, there is an actual averaging of the jitter and vertical resolution so that the summation signal has a lower error component because of this constant error averaging. Actually, the input to the delay line 214 is a reconstructed version of the signal $U-jV$ with the error averaging, which reconstructed version is produced from the current line signal and the signal from the previous line. This can be seen since the inputs to the summing circuits are the current line signal and the signal from the previous line. The output from the delay line 214 is the signal $U+jV$ since the delay line is designed to have the delay value to provide for a one-line delay plus a compensation for the quarter-line offset. It is to be appreciated that when the input to the chrominance channel for the next line, which is $U-jV$, occurs, then the situation discussed above reverses.

The embodiment of FIG. 6, therefore, essentially includes the use of a two-line delay but reconstructs a portion of the signal so as to provide for a constant error averaging. The output from the delay line 214 is then added with the luminance signal to provide the second input to the video switch 14. When a dropout occurs as detected by the detector 10, the video switch 14 is controlled to provide for the use of the delayed dropout compensating signal. The embodiment of FIG. 6 is an improvement over the embodiment of FIG. 5 but still includes a two-line delay. It would be desirable to provide for a complete functional operation on the original signal so that the signal from the previous line may be used rather than the signal from two lines back.

FIG. 7 is a third embodiment of the invention wherein the color signal is reconstructed so as to provide for the use of the previous line as the dropout compensating signal. In FIG. 7, the FM video signal from the head switcher is applied to the detector 10 and the demodulator 12 as with the previous embodiments illustrated in FIGS. 5 and 6. The output from the demodulator 12 is applied as the first input to the video switch 14 and the output from the detector 10 controls the video switch 14. The output from the video switch 14 is coupled through the amplifier 102 to provide for the compensated video output signal. The feedback path around the video switch 14 which provides for the second input to the video switch 14 includes the luminance channel and the chrominance channel.

The luminance channel is shown in more detail than with the previous embodiments and includes an oscillator and AM modulator 300. The luminance portion of the signal is therefore modulated to a higher frequency. The output from the oscillator and AM modulator is applied through a glass delay line 302. The luminance signal is remodulated since the glass delay line operates with a greater efficiency at higher frequencies. The output from the glass delay line is applied to the demodulator 304 to reconstitute the luminance portion of the video signal.

The chrominance or color portion of the video signal first passes through a 3 mHz. high-pass filter 306. The chrominance portion of the video signal which has a notation of $U+jV$ is then applied to a delay line 308, which delay line has a delay approximately equal to one line. The output from the delay line 308, therefore, is the previous line which has a notation of $U-jV$. The output from the high-pass filter 306 is also applied to a summing circuit 310. The output from the delay line 308 may also be applied through a trimmer delay 312 to the summing circuit 310. The trimmer 312 insures that the exact output from the trimmer is the $U-jV$ signal. The summer 310 provides for a 2U signal which is used as an input to a frequency doubler locked oscillator and phase trimmer 314. The oscillator 314 produces an output signal having a value of 2 fc, which is one input to a balanced modulator 316. The second input to the balanced modulator 316 is the output from the delay line 308. 2 fc is the frequency equal to twice the carrier frequency of the modulated color signal. This frequency is approximately 8.8 MHz. for the presently used PAL color television system but it should be appreciated that this invention is not restricted to any particular frequency for the subcarrier.

The balanced modulator 316 uses the 8.8 MHz. signal and the signal from the delay line 306 to produce an output signal which contains as components both the $U+jV$ and $U-jV$ signals. However, because of the operation of the balanced modulator, the $U+jV$ portion of the output signal is in the desired frequency range, whereas the $U-jV$ portion of the output signal is at a much higher frequency. The low-pass filter 318 eliminates the higher frequency portion of the output signal from the balanced modulator and the output from the low-pass filter 318 represents the signal $U-jV$ which has been delayed only one line. The operation of the balanced modulator to generate the conjugate function can be shown as follows: $U-JV$ is an abbreviated form of $U \sin \omega t - v \cos \omega t$, and the 8.8 MHz. signal is $-2 \cos 2\omega t$ where $\omega$ is the subcarrier frequency. The $-2 \cos 2\omega t$ represents the amplitude and phase of the 8.8 MHz. signal out of the oscillator. Since the modulator is a balanced modulator, its output is the product of the two signals.

$$[-2 \cos 2\omega t]\,[U \sin \omega t - V \cos \omega t]$$

Using the trigonometric relationships, $\cos X \sin Y = 1/2\,[\sin(x+y) - \sin(x-y)]$ and $\cos X \cos Y = 1/2[\cos(x+y) + \cos(x-y)]$, we find the product to be $-U \sin 3\omega t + U \sin \omega t + V \cos 3\omega t + V \cos \omega t$.

The low-pass filter 318 eliminates the 3 $\omega t$ terms, thus the output of 318 is $U \sin \omega t + V \cos \omega t$. Therefore, the system of FIG. 7 reconstitutes the proper phase relationship from the previous line's information so that if a dropout occurs the previous line information is used with the proper phase relationship. The output from the low-pass filter 18 is added to the output from the demodulator 304 to produce the proper input signal to the video switch 14.

Figure 8:
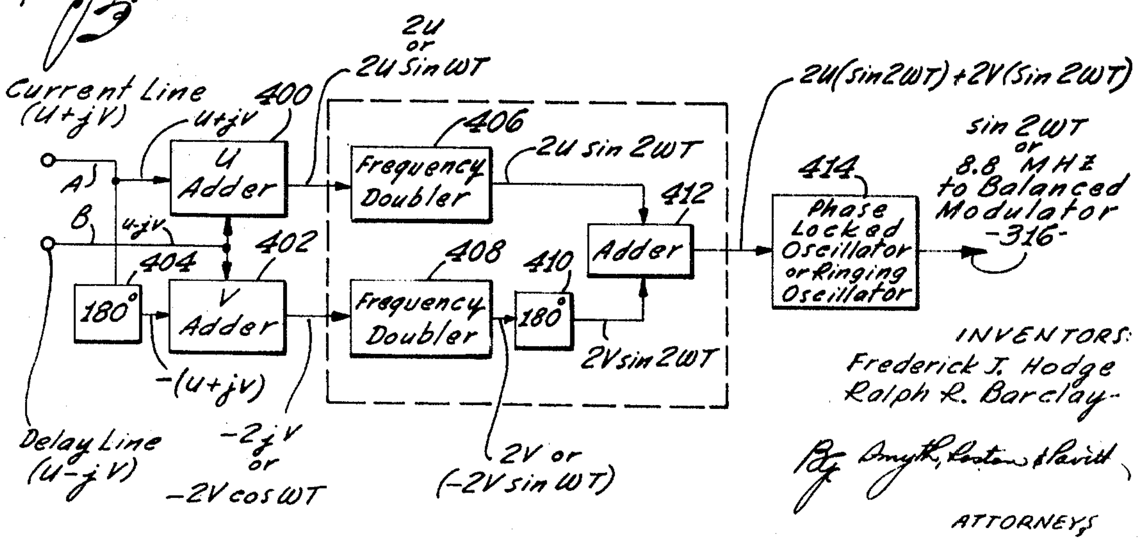
FIG. 8 illustrates an improvement in the embodiment of the invention shown in FIG. 7.

FIG. 8 illustrates an improved version of the dotted portion of the system shown in FIG. 7 and, in addition, further explains certain aspects of the system of FIG. 7. The two inputs to the summing circuit 310 are designated A and B and are shown as the inputs to the improvement of FIG. 8. The improvement of FIG. 8 includes a pair of adders 400 and 402 referred to as the U adder and V adder. The input to the U adder is from the lines A and B and produces an output signal of 2U, or, as written in the fuller form, 2U sin $\omega t$, where $\omega t$ represents the frequency of the rotation of the vectors U and V. The $-2jV$ signal is formed in the V adder 402 which has as a first input the B signal and as a second input the A signal as passed through a phase inverter 404. These vectors U and V are 90° out of phase so that if the 2U signal is designated as 2U sin $\omega t$, and the $-2jV$ signal is designated as $-2V \cos \omega t$.

The outputs from the U adder 400 and the V adder 402 are applied to frequency doublers 406 and 408. The output from the frequency doubler 406 is 2U sin $2\omega t$ and the output from the frequency doubler 408 is $-2V \sin 2\omega t$. By frequency doubling, the signals from the U and V adders appear on the same axis but 180° out of phase. Therefore, the output from the frequency doubler 408 is passed through a phase inverter 410 so that the output from the phase inverter 410 is 2V sin $2\omega t$. The two signals are then applied to an adder 412 to produce the signal $2U \sin 2\omega t + 2V \sin 2\omega t$. This signal is used to control the phase locked oscillator 414.

The oscillator 414 is phase locked when either the signal 2U sin $2\omega t$ or the signal 2V sin $2\omega t$ is present so that the oscillator 414 is locked when either the U or V component is present. With the embodiment shown in FIG. 7, only the U component is present and since the oscillator 314 is only locked when a signal component is present, there could occur situations when the U component is missing and the oscillator 314 would not be locked.

The output from the oscillator 414 therefore is a signal as represented by sin $2\omega t$, which output is at a frequency of approximately 8.8 mHz. This output signal from the oscillator 414 may be used as shown in the embodiment of FIG. 7 as an input to the balanced modulator 316.

The present invention therefore discloses a dropout compensator for the PAL color television system and incorporates the splitting of the video signal into luminance and chrominance channels. The luminance information is delayed either one or two lines as is desired and it is to be appreciated that even in the embodiments of the invention such as that shown in FIG. 5 where the chrominance information is delayed for substantially two lines, the luminance delay may still only be one line so that the compensating signal actually includes luminance information of one line plus color information of a different line. However, this compensating signal is sufficient to provide for compensation when the original signal is missing due to a dropout.

As described above, various forms of the invention are shown, such as a first embodiment which may be generally termed a two-line delay system. A second embodiment of the invention is similar to the two-line delay system but includes the constant error averaging. A third embodiment of the invention provides only a single-line delay but provides for a reconstituted signal using the previous line of information. In all of the embodiments of the invention, the compensating signal is more than a delayed version of the original signal since the color information portion of the signal actually undergoes a functional operation.

The invention has been described with reference to a particular form of a dropout compensation and specifically the form shown in FIG. 1. It is to be appreciated, however, that other forms of compensators as shown by FIGS. 2, 3 and 4 are known and the invention may be applied to any type of dropout compensator which uses the delay principle to provide for a compensating signal when the dropout occurs. When using a form of the invention such as shown in FIGS. 3 and 4, it may be necessary to provide for a demodulation of the color information with a subsequent modulation of the reconstituted color information in order to provide for the most accurate type of dropout compensation. Although the invention has been shown and described with reference to particular embodiments, it is to be appreciated that various adaptations and modifications may be made and the invention is only to be limited by the appended claims.

We claim:

1. A dropout compensator for the PAL color television system wherein the video signal contains luminance information and color information and wherein alternate lines of the color information are the conjugate of each other and with an additional quarter-line offset in phase between alternate lines, including first means responsive to each line of the luminance information for delaying the lines of luminance information a first predetermined period of time to produce from the first means a first output signal which may be substituted for the luminance information upon the occurrence of a dropout in the video signal, second means responsive to each line of the color information for delaying the lines of color information a second predetermined period of time to produce a second output signal, third means coupled to the second means and responsive to the second output signal for producing a modified second output signal which has lines of information which are the conjugate of the lines of information of the second output signal and which is compensated for the quarter-line offset between alternate lines which modified second output signal may be substituted for the color information upon the occurrence of a dropout in the video signal, fourth means for switching and with the fourth means receiving the video signal as a first input and for receiving the first output signal and the modified second output signal as a second input and for passing either the first or second input signals through the fourth means, and fifth means responsive to the video signal for detecting dropouts in the video signal and with the fifth means coupled to the fourth means to control the fourth means to pass the second input signal when the fifth means detects a dropout in the video signal.

2. The dropout compensator of claim 1 wherein the second means provides a delay of approximately two scanning lines to produce a phase inverted second output signal having characteristics similar to the color information and wherein the third means provides for a phase inversion of the second output signal.

3. The dropout compensator of claim 1 wherein the second means provides for a delay of approximately one scanning line and wherein the third means includes a summing network to provide for a summing of the second output signal and the color information to average the error between the color information and the second output signal and with the third means also including a delay means for providing a delay of approximately one scanning line.

4. The dropout compensator of claim 1 wherein the second means provides for a delay of approximately one scanning line and wherein the third means includes a balanced modulator responsive to the second output signal for modulating the second output signal to produce the modified second output signal including a portion having characteristics similar to the color information.

5. In a dropout compensator for the PAL color television system wherein alternate lines of color information are the conjugate of each other and have a quarter-line offset between alternate lines wherein the dropout compensator is of the type wherein a dropout compensating signal is formed from the color information and is used in place of the color information when a dropout occurs, means for forming the dropout compensating signal, including first means responsive to the color information for delaying the lines of color information a predetermined period of time to produce a first output signal, and second means coupled to the first means and responsive to the first output signal for producing a modified first output signal having lines which are the conjugate of the lines of color information of the first output signal and which is compensated for the quarter-line offset and which modified first output signal may be used in place of the color information when a dropout occurs in the color information.

6. In the dropout compensator of claim 5 wherein the first means provides a delay of approximately two scanning lines to produce a phase inverted first output signal having characteristics similar to the color information and wherein the second means provides for a phase inversion of the first output signal.

7. In the dropout compensator of claim 5 wherein the first means provides for a delay of approximately one scanning line and wherein the second means includes a summing network to provide for a summing of the first output signal and the color information to average the error between the color information and the first output signal and with the second means also including a delay means for providing a delay of approximately one scanning line.

8. In the dropout compensator of claim 5 wherein the first means provides for a delay of approximately one scanning line and wherein the second means includes a balanced modulator responsive to the first output signal for modulating the first output signal to produce the modified first output signal including a signal having characteristics similar to the color information.

9. In a dropout compensator for the PAL color television system wherein the video signal includes color information and wherein alternate lines of color information are the conjugate of each other and wherein the dropout compensator is of the type wherein a dropout compensating signal is formed from the color information and is used in place of the color information when a dropout occurs, means for forming the dropout compensating signal, including first means responsive to the video signal for passing the color information and blocking other information, second means coupled to the first means for delaying the color information approximately two scanning lines but with a phase inversion to provide a phase inverted delayed color information signal, and third means coupled to the second means for phase inverting the phase inverted delay color information signal.

10. In the dropout compensator of claim 9 wherein each succeeding line of color information is offset from the previous line and wherein the second means includes a delay to compensate for the offset.

11. In the dropout compensator of claim 9 wherein the second means is a fixed delay line and additionally including an adjustable delay line adjusted to provide the proper delay in the system.

12. In a dropout compensator for the PAL color television system wherein alternate lines of color information are the conjugate of each other and wherein the dropout compensator is of the type wherein a dropout compensating signal is formed from the color information and is used in place of the color information when a dropout occurs, means for forming the dropout compensating signal, including first means responsive to the color information for providing a delay of the color information for approximately one scanning line, second means responsive to the color information for providing a phase inversion of the color information, third means responsive to the color information, the phase inverted color information and the delayed color information for producing from the color information, the phase inverted color information and the delayed color information an averaged output signal which is the conjugate of the color information and has an average error component; and fourth means responsive to the averaged output signal for providing a delay of the averaged output signal of approximately one scanning line to produce a color dropout compensating signal.

13. In the dropout compensator of claim 12 wherein the third means includes a pair of summing networks and wherein one summing network sums the color information and the delayed color information and wherein the other summing network sums the phase inverted color information and the delayed color information and wherein the outputs of the summing networks are added together.

14. In the dropout compensator of claim 12 wherein each succeeding line of color information is offset from the previous line and wherein the first means and the fourth means each provide a delay to compensate for the offset.

15. In a dropout compensator for the PAL color television system wherein alternate lines of color information are the conjugate of each other and wherein the dropout compensator is of the type wherein a dropout compensating signal is formed from the color information and is used in place of the color information when a dropout occurs, means for forming the dropout compensating signal, including first means responsive to the color information for providing a delay of the color information of approximately one scanning line, second means responsive to the color information and the delayed color information for summing the color information and the delayed color information to produce a control signal, third means for providing an oscillating signal and with the third means responsive to the control signal to lock the frequency of the oscillating signal in accordance with the control signal, and fourth means responsive to the oscillating signal and the delayed color information signal for modulating the delayed color information signal with the oscillating signal to produce an output signal including a portion having characteristics similar to the color information.

16. In the dropout compensator of claim 15 wherein the third means produces an oscillating signal having twice the frequency of the control signal.

17. In the dropout compensator of claim 15 wherein the oscillating signal is twice the frequency of the control signal and wherein the fourth means is a balanced modulator and with the output signal including a first portion of the output signal at the frequency of the control signal and including a second portion of the output signal at three times the frequency of the control signal and additionally including means for passing the first portion of the output signal and blocking the second portion of the output signal.

18. In a dropout compensator for the PAL color television system wherein alternate lines of color information are the conjugate of each other and wherein the dropout compensator is of the type wherein a dropout compensating signal is formed from the color information and is used in place of the color information when a dropout occurs, means for forming the dropout compensating signal, including first means responsive to the color information for providing a delay of the color information of approximately one scanning line, second means responsive to the color information and the delayed color information for summing the color information and the delayed color information to produce a first control signal, third means responsive to the color information and the delayed color information for phase inverting the color information and for summing the phase inverted color information and the delayed color information to produce a second control signal, fourth means for frequency doubling the first and second control signals, fifth means for phase inverting the first frequency doubled control signal relative to the second frequency doubled control signal, sixth means for providing an oscillating signal and with the sixth means responsive to the frequency doubled control signals to lock the frequency of the oscillating signal in accordance with the frequency of the control signals, and seventh means responsive to the oscillating signal and the delayed color information signal for modulating the delayed color information signal with the oscillating signal to produce an output signal including a portion having characteristics similar to the color information.

19 In the dropout compensator of claim 18 wherein the sixth means produces an oscillating signal having the same frequency as the frequency doubled control signals.

20. In the dropout compensator of claim 18 wherein the oscillating signal is twice the frequency of the first and second control signals and wherein the seventh means is a balanced modulator and with the output signal including a first portion of the output signal at the frequency of the first and second control signals and including a second portion of the output signal at three times the frequency of the first and second control signals and additionally including means for passing the first portion of the output signal and blocking the second portion of the output signal.